Inventor
N. E. Nilsson
By Glascock Downing & Seebold
Attys.

Inventor
N. E. Nilsson
By Glascock Downing & Seebold
Attys

Inventor
N. E. Nilsson
By Glascock Downing & Seebold
Attys.

PRIVATE AUTOMATIC BRANCH EXCHANGE

Filed Oct. 22, 1951 5 Sheets-Sheet 4

Inventor
N. E. Nilsson
By Glascock Downing & Seebold
Attys.

Aug. 2, 1955 N. E. NILSSON 2,714,630

PRIVATE AUTOMATIC BRANCH EXCHANGE

Filed Oct. 22, 1951 5 Sheets-Sheet 5

Inventor
N. E. Nilsson
By Glascock Downing & Seebold
Attys.

United States Patent Office 2,714,630

Patented Aug. 2, 1955

2,714,630

PRIVATE AUTOMATIC BRANCH EXCHANGE

Nils Emil Nilsson, Stockholm, Sweden, assignor to Telefonaktiebolaget L M Ericsson, Stockholm, Sweden, a Swedish company Application October 22, 1951, Serial No. 252,509

Claims priority, application Sweden November 16, 1950

4 Claims. (Cl. 179—27)

The present invention relates to private automatic branch exchanges with extension lines, which can over selecting devices be either interconnected or connected with any line out of a number of exchange lines to a main exchange. Outgoing calls to the main exchange are put through wholly automatically, whereas incoming calls from the main exchange are received in a manual operating board, wherefrom they are then connected to the desired extension.

In modern private branch exchanges an extension connected to an exchange line must be able to effect internal connections to get information from other extensions within the subscriber's exchange without the communication with the exchange line being disconnected. At such enquiries it must be possible to connect the extension alternatively to the exchange line and to the extension, which has been called for enquiry, by means of a simple operation, for example an impulse on the dial of the extension instrument. It must further be possible to switch the extension or to transfer it to the extension called for enquiry, should this be suitable. In the private branch exchanges known until now devices for enquiry and transfer entail a great number of relays in the line equipments of the exchange lines.

In the known private branch exchanges each exchange line has a jack or a switch in the manual operating board, by means of which calls from the exchange line are answered to.

The object of the present invention is to reduce the costs for enquiry and transfer, and this is achieved partly by arranging at least one connecting link to which a calling exchange line is connected over special selectors and which puts the call through to the manual operating board, partly with help of a register connected to said connecting link and set from the operating board in accordance with the telephone number of the extension indicated by the caller, and partly by arranging an auxiliary line outgoing from said connecting link, with which auxiliary line the register first connects said extension by means of the selecting devices in the exchange and which is released simultaneously with said connecting link and register after an answer has been obtained from the extension line and the extension line has been connected by said register to the calling exchange line over said selecting devices.

A considerable saving is achieved with the invention, in that relay devices, which were previously necessary for each particular exchange line, can be arranged in the above mentioned connecting links which, as well as a register, are only busied at connection of a communication, and therefore are only few.

The invention will be more closely described below with reference to the accompanying drawings Figs. 1–5.

Figure 1:
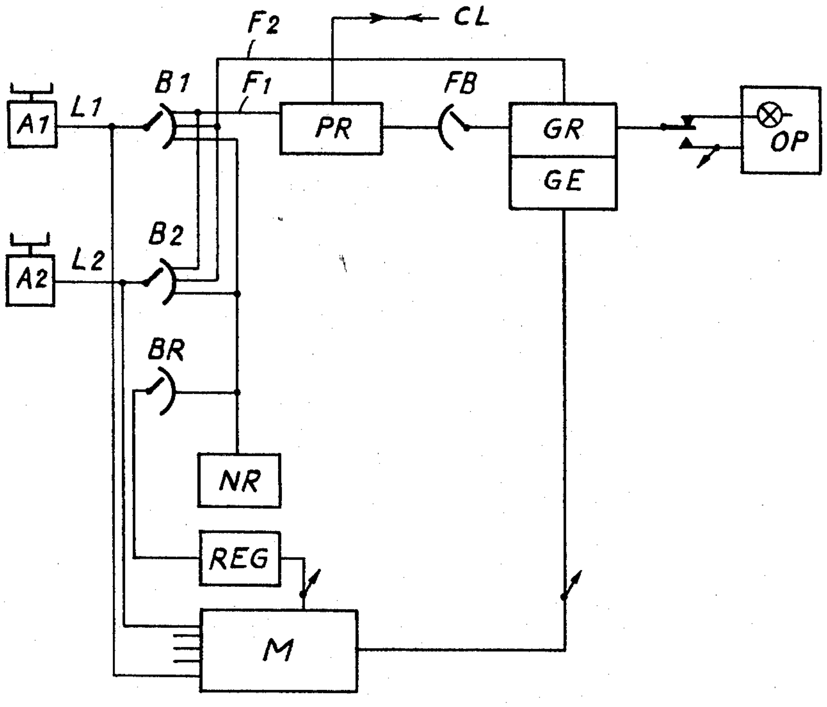

Fig. 1 is a general diagram in which A1 and A2 are two telephone instruments connected to the extension lines L1 and L2, each of which has a selector B1 resp. B2. The extension lines can be interconnected over the selectors B1 and B2 by simultaneous connection to a link circuit NR and connected with any out of a number of exchange lines CL by connection with the line F1 to the line equipment PR for an exchange line CL. Each call from A1 or A2 is first connected to a link circuit NR, a register REG being thereby also connected to the link over a selector BR.

If the direction digit 0 is taken, the register switches the calling extension line by means of a marker M from the link circuit NR to the line F1 for an exchange line CL.

A call from an exchange line CL is automatically connected to a special connecting link GR over a selector FB, whereby a call lamp pertaining to a link GR glows in a manual operating board OP. The operator in the operating board OP answers the call by switching over a key. There is a register GE pertaining to each connecting link GR, which register is set from the manual operating board in accordance with the number of an extension line indicated by the caller. The register GE connects itself to the marker M by means of which it sets a communication between said extension and the connecting link GR over an auxiliary line F2. When the extension has answered and the operator departs from the connection, the register GE puts through a new communication by means of the marker M, whereby the called extension is connected to the exchange line CL over the line F1 and the line equipment PR.

Due to the connecting link GR with pertaining register GE and the above described operating process, a considerably simpler connecting process is obtained when connecting an enquiry call and transferring a communication. Thus, a communication is for example connected from the instrument A1 over line L1, selector B1, line F1, line equipment PR and exchange line CL. If the subscriber at the instrument A1 wishes to make an enquiry, an impulse is emitted by means of the dial, whereby the line equipment PR is actuated so that the line F1 is connected to a connecting link GR over the selector FB, whereas the exchange line CL is separated for waiting. The register GE is set by the operator or directly from the instrument A1 in accordance with the telephone number of for example the instrument A2 and puts through a communication over the line F2. By means of an impulse on its dial, the instrument A1 can then be connected now to the exchange line CL and now to the instrument A2. If the subscriber at the instrument A1 puts down his micro-telephone, the register GE connects the instrument A2 to the exchange line C1 by means of the marker M over the line F1. Simultaneously, the instrument A1 is released and the communication over the line F2 disconnected. The communication has thus been transferred from the instrument A1 to the instrument A2.

An embodiment of the invention is shown in Figs. 2–5, where a cross-bar switch is used. The figures show a P. B. X-exchange with two-digit subscriber's number, 5 link circuits NR, 2 registers REG, 4 exchange lines CL and 2 connecting links GR.

At call from the subscriber's instrument A1 the line relay LR1 attracts its armature with current over the line circuit, the upper winding of the line relay, and the contacts 121 and 122. The contacts 111—114 are actuated. The following circuit is closed: negative, winding on operating magnet BM1, contacts 124, 113, winding on relay R2 to positive. Relay R2 closes contact 120, whereby circuits connected in parallel arise for the relays R3 and R4, for example +, contacts 120, 103, 136, 130 and 134, winding on relay R3, wire $v6$, contacts 322 and 332 in Fig. 3 to negative. The contacts 322 and 332 pertain to a register REG and are closed if the register is free. We suppose that there are two registers REG, one for each one of the relays R3 and R4, and that the register corresponding to relay R3 is free. Relay R3 attracts its armature and actuates the contacts 131—136. The operating magnet BM1 is not actuated in series with relay R2, since said relay has a high resistance. Contact 133 closes the following circuit: +, contacts 133, 102, 140, 163—153, circuits connected in parallel by means of the intermediate winding on relay R1 and by means of the selecting magnets S2—S6, for example over contact 151, the lower winding on selecting magnet S2, wire *d*3, contact 211, to negative in Fig. 3. Contact 211 pertains to a link circuit NR for internal communications within the subscriber's exchange and is closed if the link circuit is free. We suppose that the selecting magnet S2, which pertains to the link circuit NR in Fig. 3, attracts and actuates the contacts 151—155. The selecting magnets S2—S6 form a row, in which only one selecting magnet at a time can be operated. The current through the intermediate winding of relay R1 is broken, when there is a free link circuit, said relay thereby being prevented from attracting its armature. The selecting magnet S2 now indicates which link circuit NR has to be connected, and relay R3 indicates which register REG has to be connected. The following circuit is closed: +, contacts 154 and 132, winding on operating magnet BRM, wire *v*5, contact 321 in Fig. 3, winding on the slow-releasing relay RR3, to negative. The operating magnet BRM attracts its armature. Contact 191 and the four multiple contacts *a*31, *b*31, *c*31 and *d*31 are actuated. Simultaneously, the following circuit has been closed: +, the lower winding on relay R1, contacts 141, 155, 113 and 124, winding on operating magnet BM1 to negative. The operating magnet BM1 attracts its armature and actuates the contacts 121—124 and the three multiple contacts *a*12, *b*12 and *c*12. Contact 124 breaks the current for relay R2. The operating magnet BM1 is energized over the multiple contacts *c*12 and *b*31, wire *v*2, resistance *r*1 to an auxiliary battery V+, which gives a positive voltage with relation to the positive pole of the exchange battery. The current in the lower winding of the line relay will thereby be given such a direction, that the relay is kept actuated during interruptions in the line circuit over line L1 at impulse emission to the register REG. A link circuit NR and a register REG are thereby connected to the calling subscriber's line.

The above described connecting process is so quick, that two or more calls very seldom occur simultaneously. Should two calls take place at the same time, both calling lines will be connected to a special busy position in the operating bars for cross-bar switches B1 and B2. The resistance in the lower winding of relay R1 is chosen so that if two operating magnets, for example BM1 and BM2, are simultaneously connected over the contacts 113 and respectively 1013 none of them can attract its armature. Relay R1, which is slow-actuating and has normally not time to be actuated, will now instead attract its armature. Contact 100 is closed. Selecting magnet S1 attracts. The contacts 101—105 are actuated. The current for the selecting magnet S2 is broken in contact 102. Selecting magnet S2 releases its armature. The operating magnets BM1 and BM2 are energized over contact 104, which short-circuit the lower winding of relay R1 and attracts. For e. g. line L1 a circuit is now closed from + through a choke coil D over contact all, line L1 and instrument A1, contact 112 through the upper winding on line relay LR1. At the same time, the lower winding on relay LR1 is short-circuited and operating magnet BM1 is kept energized over contacts 114 and *c*11. The caller hears busy signal from the buzzer generator S*u*1 over condenser Co.

Figure 3:
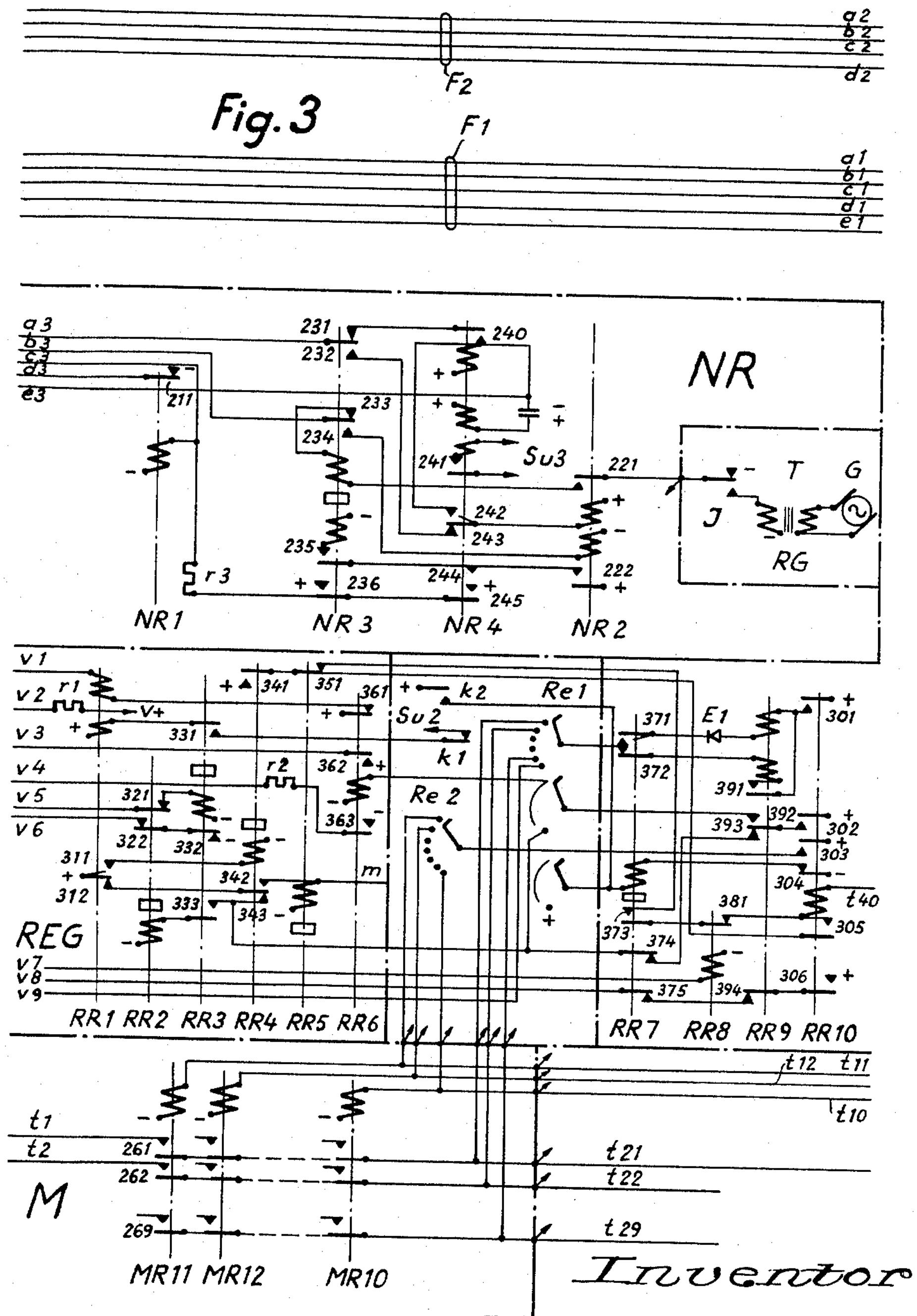

If a subscriber's instrument A1 has been connected to a link circuit NR and a register REG over the operating bars B1 and BR, the following circuit is closed: +, contact 361 in Fig. 3, the upper winding on impulse relay RR1, wire *v*1, contacts *a*31 and all, line L1 and subscriber's instrument A1, contact 112, the upper winding on line relay LR1, to negative. The impulse relay RR1 attracts and the line relay LR1 is kept magnetized. The contacts 311—312 are actuated. The slow-operating holding-relay RR4 actuates the contacts 341—343. At the same time, relay RR3 attracts in series with the operating magnet BRM. The contacts 331—333 are actuated. Contact 331 connects a generator for the register buzzer S*u*2 to the lower winding on impulse relay RR1. The caller hears buzzer tones and can now begin dialling.

The first impulse train sets the selector R*e*1 in the register and the second impulse train sets the selector R*e*2. The impulse trains are emitted over contacts 312 and 342 and wire *m*. The circuits for the register setting are quite conventional and have therefore been omitted in order to spare place. At the first impulse in an impulse train relay RR5 attracts and actuates contact 351 and remains thereafter energized, owing to its being slow-operating, until the end of the impulse train. When selector R*e*1 leaves its initial position, contact *k*1 is released and buzzer generator S*u*2 is disconnected. When selector R*e*2 leaves its initial position contact *k*2 is closed and relay RR7 is energized and actuates the contacts 371—375. After the end of the second digit, relay RR5 is released. Contact 351 closes the following circuit: +, contacts 341, 351, 373 and 381, winding on relay RR10, wire *t*40, winding on relay MR1 in Fig. 4, contacts 271, 278—276 and 275—273, to negative.

Figure 4:
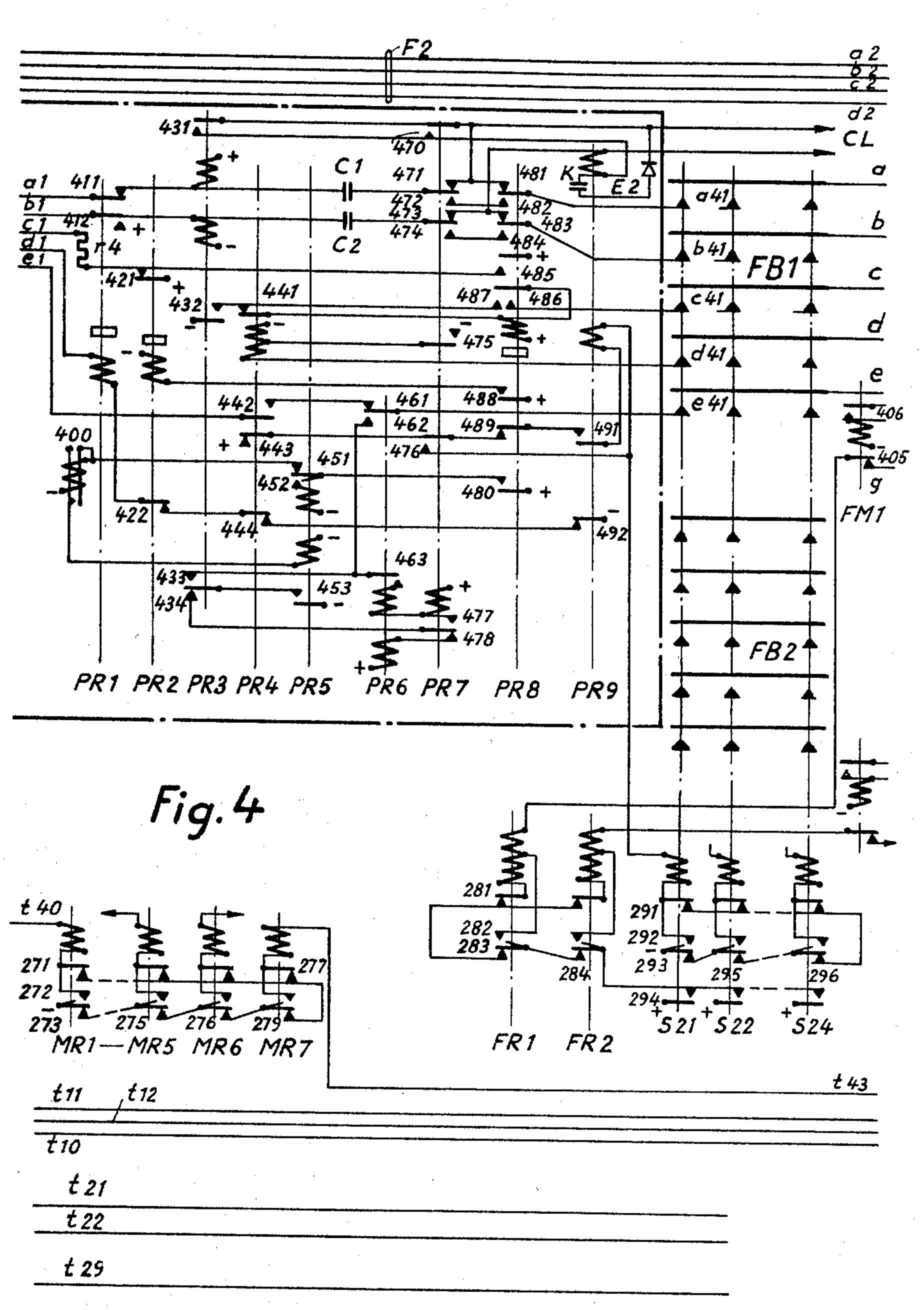

Relays MR1—MR7 in Fig. 4 form a chain in which only one relay at a time can be actuated. Relays RR10 and MR1 attract if the marker M in Fig. 3 is free, that is if no other relay in the chain MR1—MR7 is actuated. Should the marker M be busy, the register REG waits until it is free.

The contacts 301—306 and 271—273 are actuated, when the register REG is connected to the marker M. Contact 303 closes a circuit over selector R*e*2 to a unit relay, for example MR11, if the registered subscriber's number ends with the digit 1. The contacts 261—269 are closed. The following test circuit is closed: +, contact 301, the upper winding on test relay RR9, rectifier E11, contact 371, one of the positions in the upper contact row in selector R*e*1, for example the second position from the top, contact 262, wire *t*2, winding on operating magnet BM2, to negative. If the called line is free, relay RR9 attracts its armature. The operating magnet BM2 does not attract in said circuit since the upper winding on relay RR9 has a high resistance. Contacts 391—394 are actuated. Relay RR6 attracts in the following circuit: +, contacts 302 and 392, the intermediate row on selector R*e*1, winding on relay RR6, to negative. Contacts 361—363 are actuated. Selecting magnet S2 and relay R5 attract in the following circuit: +, contact 362, wire *v*3, contact *c*31, the upper winding on selecting magnet S2, winding on relay R5, to negative. Contacts 140, 141 are actuated and prevent any other of the selecting magnets than S2 to attract simultaneously and any calling subscriber's line to be wrongly connected. Simultaneously with test relay RR9 being connected, the current is broken for the slow-operating relay RR7 by contact 304. When relay RR7 releases, selecting magnet S2 is actuated. Relay RR10 is kept energized over contact 305. Operating magnet BM2 attracts in the following circuit: +, contacts 301 and 391, the lower winding on relay RR9, contact 372, the upper contact row on selector R*e*1, contact 262, wire *t*2, winding on operating magnet BM2 to negative. The contacts 1021—1024 and the multiple contacts *a*22, *b*22, *c*22 are actuated. Line L2 is connected to the link circuit NR.

When the contact 361 in register REG is broken, the impulse relay RR1 releases its armature. The current for the slow-operating holding relay RR4 is broken. When relay RR4, which is considerably slower than relay RR9, releases its armature, relay RR2 is energized over contacts 312, 343 and 333 and actuates contacts 321—322. The operating magnet BRM releases its armature and the register is disconnected from the link circuit NR. Relay RR3 releases and thereafter relay RR2 also releases. Register REG is restored over circuits which are not shown in the diagram.

In link circuit NR in Fig. 3 the following connecting process takes place. When register REG is connected, relay NR1 attracts in the following circuit: V+, resistance *r*1, wire *v*2, contacts *v*31 and *c*12, wire *c*3, winding on relay NR1 to negative. Contact 211 is actuated, whereby the link circuit is marked busy. When contact 363 in register REG is closed, relay NR4 in link circuit NR attracts in the following circuit: +, the upper winding on relay NR4, wire *e*3, contact *d*31, wire *v*4, resistance *r*2, contact 363 to negative. The contacts 240—245 are actuated. The following holding circuit is closed for relays LR1 and NR4: +, the upper winding on relay NR4, contacts 240 and 231, wire *a*3, contact *a*12, winding L1 and instrument A1, contact 112 winding on relay LR1, to negative. When contact 242 closes, the upper winding on relay NR2 is connected in parallel with the upper winding on relay NR4. Relay NR2 closes the contacts 221—222. Contact 245 connects + over a resistance *r*3 to wire *c*3 for holding the communication. A ring signal is now emitted to the called instrument A2 from the ring generator G over ring transformer T, the secondary winding of which is connected to negative, interruptor I, contact 221, the upper winding on relay NR3, contact 233, wire *b*3, contacts *b*22 and 1011, line L2 and instrument A2, contact *a*22, wire *a*3, contact 231 and 240, the electrolytic condenser C, the intermediate winding on relay NR, to positive. At the same time the ring tone from a buzzer generator S*u*3 is transformed over contact 241 and the lower winding on relay NR4 to the intermediate winding on relay NR4. The caller at instrument A1 hears the ring tone. When answer is received from the called instrument A2, the relay NR3, which is not sensitive to the ring current, attracts in the D. C. circuit closed over the instrument A2. Contacts 231—236 are actuated. During release time for relay NR4, which is slow-releasing owing to the electrolytic condenser C, line relay LR1 in Fig. 2 releases. Relay NR3 is kept energized by means of an auxiliary winding over contacts 235 and 244. When contact 243 closes the two instruments A1 and A2 connected in parallel are fed with current over the windings on relay NR2. Relay NR3 is kept energized over contact 222 and the connection is held with + over contact 236 and resistance *r*3.

The two windings on line relay LR1 cooperate when the register is connected. When register REG is disconnected, the current is reverted in the lower winding of LR1, and will therefore slightly counteract the upper winding and contribute to release the relay, if the current is broken through the upper winding.

If the called line L2 is busy, the test relay RR9 does not actuate in register REG. When relay RR7 releases its armature, relay RR2 attracts in the following circuit: +, contacts 302, 393, 374 and 333, winding on relay RR2, to negative. Contacts 321 and 322 break. The operating magnet BRM releases. Contacts *a*31, *b*31, *c*31 and *d*31 release. Relay RR1 releases. During the release time for relay RR4, relay RR10 is kept energized and relay R1 in Fig. 2 attracts in the following circuit: +, contacts 306, 394 and 375, wire *v*8, the upper winding on relay R1, to negative. Contact 100 is closed. Selecting magnet S1 attracts its armature and operates the contacts 101—105. At the same time, line relay LR1 and operating magnet BM1 have released their armatures, whereafter line relay LR1 attracts its armature again. When contact 104 is closed, operating magnet BM1 is energized again and instrument A1 is connected over contacts *a*11—*c*11 to the buzzer generator S*u*1 for busy marking.

If the digit 0 is registered in the selector R*e*1 in register REG, the calling instrument A1 must be connected with an exchange line CL. Relay RR7 is energized over the lowest position of the lowest contact row in selector R*e*1 and actuates the contacts 371—375. Relay RR10 actuates the contacts 301—306 if the marker M is free. The test relay RR9 attracts in the following circuit, if there is a free exchange line: +, contact 301, the upper winding on relay RR9, rectifier E1, contact 371, the lowest position in the upper contact row in selector R*e*1, wire *v*9, the lower winding on relay R5, contacts 105, 183—173, circuits connected in parallel through the selecting magnets S9—S12, for example contact 171, the lower winding on selecting magnet S9, wire *d*1, winding on relay PR1 in Fig. 4, contacts 422, 444 and 492, to negative. The test relay RR9, selecting magnet S9 and relay PR1 attract their armatures. Contacts 391—394, 171—174 and 411—412 are actuated. When relay RR7, the current of which has been broken by contact 304, releases its armature, relay RR2 is actuated in the following circuit +, contacts 302 and 392, the lowest position in the intermediate contact row in selector R*e*1, contact 343, winding on relay RR2, to negative. Contacts 321—322 are broken. Operating magnet BRM releases its armature. Line relay LR1 and operating magnet BM1 release their armatures, but LR1 attracts again, since the circuit over line L1 and instrument A1 is closed and BM1 attracts thereafter, since contact 174 is closed. Contacts 121—124, and *a*14, *b*14 and *c*14 are actuated. When the holding relay RR4 in register REG releases, relay RR10 and selecting magnet S9 release. Operating magnet BM1 is kept energized over contact *c*14, wire *c*1, resistance *r*4 and contact 421.

Figure 2:
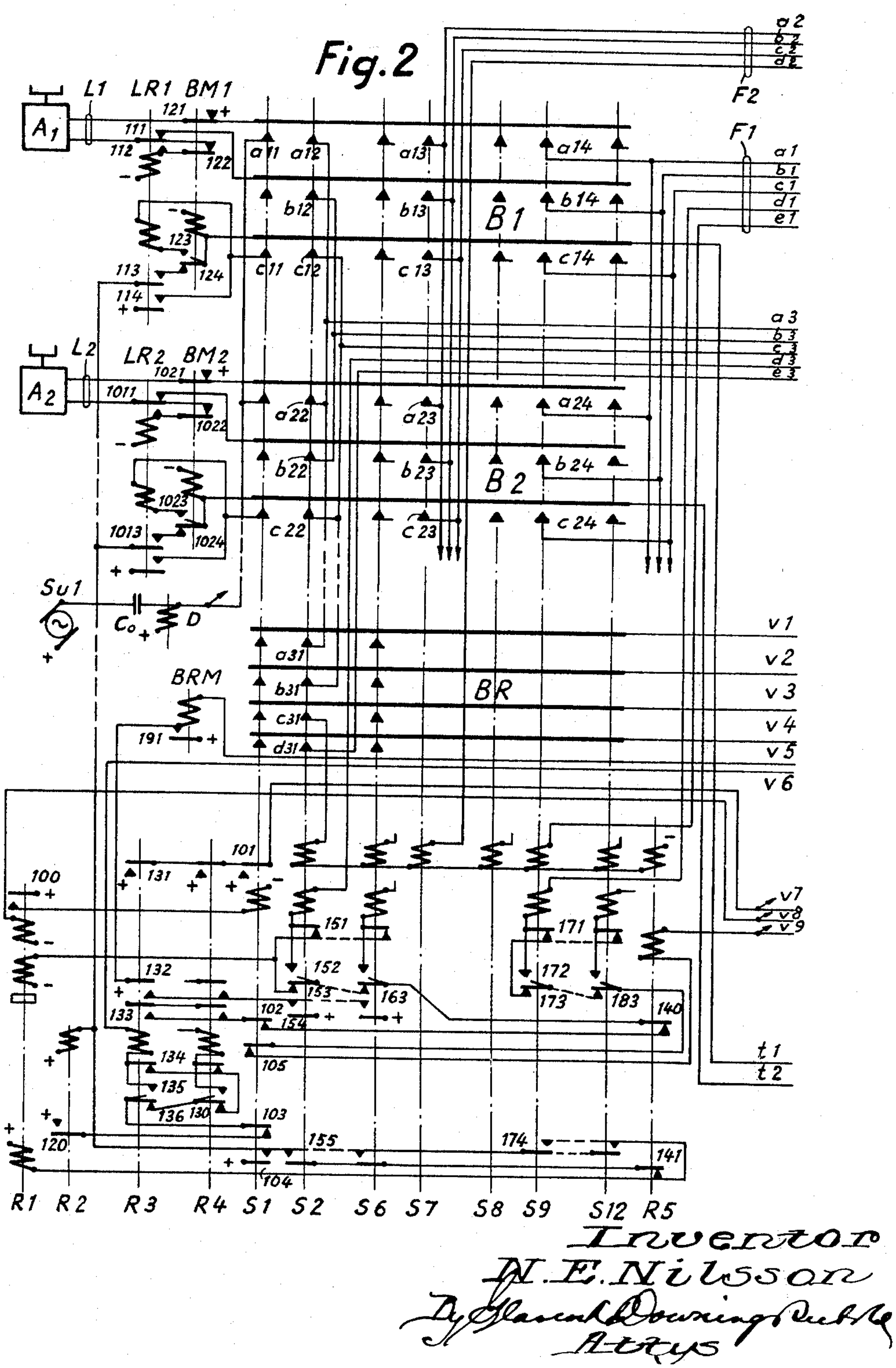

In the line equipment PR in Fig. 4 relay PR3 is energized over contact 412. Contacts 431—434 are actuated. The slow-operating holding relay PR8 is energized over contacts 432 and 441. Contacts 480—489 are actuated. Relay PR2 is energized over contact 488. Contacts 421—422 break. The holding of operating magnet BM1 in Fig. 2 is overtaken by contact 485. When the slow-operating relay PR1, the current of which is broken by contact 422, releases its armature, line L1 is connected to the wires *a*1 and *b*1 and line relay LR1 has released its armature. The instrument A1 is fed with current through the windings on relay PR3, which is thereby kept actuated when contact 412 releases.

The exchange line CL is supposed to be connected as a usual subscriber's line to a main exchange. The exchange line is provided with a receiving relay PR9 for A. C. signals with a rectifier E2 and a condenser K. The contact 431 short-circuits the rectifier E2, and the condenser K and the line circuit is closed over the winding on relay PR9, the main exchange thus being called.

The calling subscriber now hears dialling tone from the main exchange and may emit impulse trains by means of his dial, the impulses being repeated by relay PR3. This is supposed to take place during a relatively short time, limited by the thermocontact 400. Said contact is heated with current over contacts 480 and 451. Thus, when thermocontact 400 is actuated, a communication is supposed to be set up over the exchange line CL, and a further impulse from the dial of instrument A1 means, that the subscriber wishes an internal enquiry communication. The thermocontact 400 closes the following circuit for relay PR5: +, contacts 480, 451 and 400, the lower winding on relay PR5, to negative. Contacts 451—453 are actuated.

If the subscriber now emits an impulse from his dial by taking the digit 1, contact 434 closes the following circuit at the beginning of the impulse negative, contacts 453, 434 and 478, the lower winding on relay PR6, to positive. Contacts 461—463 are closed. After the end of the impulse relay PR7 attracts, and PR6 is held in the following circuit: negative, contacts 453, 433 and 463, the upper windings on relays PR6 and PR7, to negative.

Contacts 470—478 are actuated. The exchange line CL is disconnected by contacts 471 and 473 and a connecting link GR must be connected over the contacts 472, 474, 482 and 484.

The following circuit is closed: +, contacts 443 and 476, winding on selecting magnet S21, contacts 291, 296—295, and 293, to negative. The selecting magnets S21—S24 form a chain, in which only one selecting magnet at a time can be actuated. Selecting magnet S21 attracts. Contacts 291—294 are actuated. Relays FR1 and FR2 likewise form a chain, in which only one relay at a time can be actuated. The following circuit is supposed to be closed: +, contacts 294, 284, 283 and 281, windings on relay FR1, contact 405, wire *g*, the lower winding on relay GR1 in Fig. 5, contacts 16, 14 and 12, to negative. Relay FR1 attracts. Contacts 281—283 are actuated. Contact 282 short-circuits the lower winding of relay FR1, which has a relatively high resistance. Relay GR1 attracts. Contacts 511—512 are closed. The operating magnet FM1 for the operating bar for cross-bar switches FB1 attracts its armature. Contact 405 breaks, 406 closes and the multiple contacts *a*41, *b*41, *c*41, *d*41 and *e*41 close. Relay GR1 is held in the following circuit: +, the upper winding on relay BR8, which is a buzzer-winding, contacts 561, 551, 534 and 512, the upper winding on relay GR1, to negative. Relay PR4 attracts its armature in a circuit through relay GR9 in Fig. 5, wire *d*, contact *d*41, windings on relay PR4, the upper one of said windings having a high resistance and the lower one a low resistance, to negative. Contacts 441—445 are actuated. Relays PR6 and PR7 are locked during the following impulse emission to register GE in Fig. 5 in the following circuit: negative, resistance *k*5, contacts 563 and 553 in Fig. 5, wire *e*, contacts *e*41, 462 and 463, winding on relays PR6—PR7 to positive. The impulse relay GR2 in Fig. 5, actuates the contacts 521—523 owing to a circuit over wire *c*, contacts *c*41, 586, 587 and 432, to negative. The slow-operating holding relay GR3 is energized over contact 522 and actuates contacts 531—538. Contact 534 breaks the current for relay GR1, which is released, whereafter the operating magnet FM1 is kept energized over contacts 533, 590 and 406. The subscriber at instrumental A1 hears a dialling tone which is transformed between the windings on relay GR8 and fed to the upper winding through the following circuit: +, the upper winding on relay GR8, contacts 581, 561, 551, 535, 595 and *k*1 to a buzzer generator S*u*2. In register GE the holding relay ER1 attracts in a circuit over contact 535, push button OB, contacts 16, 14 and 12, and is thereafter held by contact 11.

Figure 5:
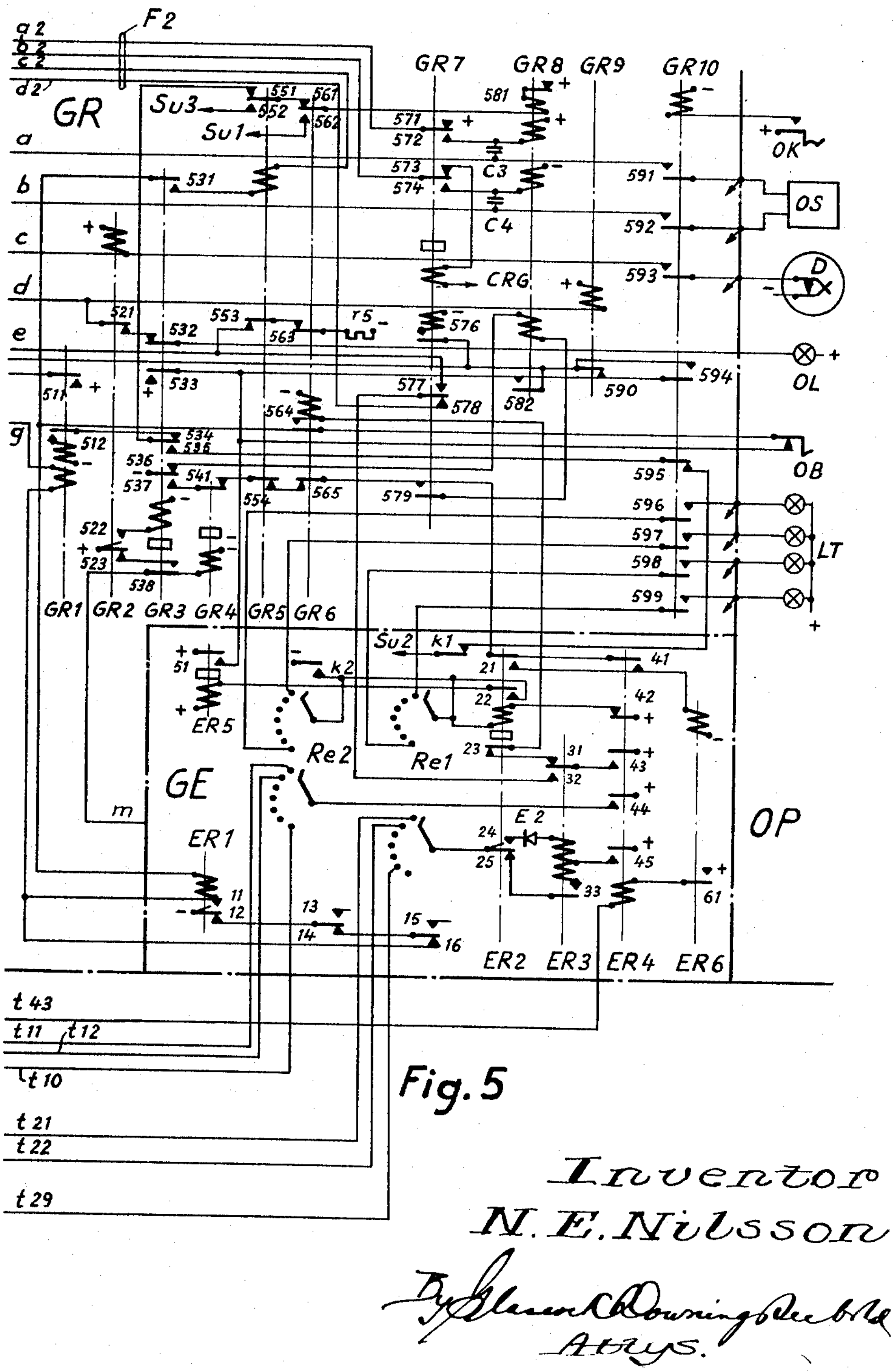

The subscriber takes the desired number on his dial, whereby impulses are repeated by relays PR3 and GR2 to wire *m* in Fig. 5. The selector R*e*1 in register GE is set by the first impulse train and the selector R*e*2 by the second impulse train. The circuits for the setting of the register are not shown, since they are quite conventional. When selector R*e*1 leaves its initial position the current from the buzzer generator S*u*2 is broken by contact *k*1, contact 16 breaks and contact 15 is closed. When selector R*e*2 leaves its initial position, contact *k*2 is closed, contact 14 breaks and contact 13 closes. Relay ER2 is energized over contacts *k*2 and 42 and actuates contacts 21—25. Relay ER5 is energized over contact 22 and closes contact 51. Relay GR4 is a slow-releasing relay, which attracts its armature at the beginning of each impulse train and remains actuated until the end of the impulse train. Relay GR4 actuates contact 541. When relay GR4 releases its armature after the end of the second impulse train, the following circuit is closed: +, contacts 537, 541, 554, 565 and 21, winding on relay ER6 to negative. Relay ER6 closes a new circuit: +, contact 61, winding on relay ER4, wire *t*43, winding on relay MR7, contacts 277, 279, 276, 275, 273 to negative. Relays ER4 and MR7 attract their armatures. Contacts 41—45 and 277—279 are actuated. Relay MR7 blocks the marker M so that no other register can be connected to said marker and relay ER4 closes the circuit for connection of the instrument called for enquiry, for example A2 in Fig. 2, to the auxiliary line F2. Contact 42 breaks the current for relay ER2, which is slow-operating. Contact 44 closes a circuit over the lower contact row on selector R*e*2, for example the first position from the top, over wire *t*11 and through the winding on relay MR11 in Fig. 3, which attracts and closes the contacts 261—269. The following test circuit is closed during the release time for relay ER2: +, contact 45, the upper winding on relay ER3, which has a high resistance, rectifier E2, contact 24, the lower contact row on selector R*e*1, for example the second position from the top, wire *t*22, contact 262, wire *t*2, winding on operating magnet BM2 in Fig. 2, to negative. If the line L2 is free, relay ER3 attracts and actuates the contacts 31—33. The following circuit is closed: +, contacts 43, 32, 578, wire *d*2, winding on selecting magnet S7, the upper winding on relay R5, to negative. Selecting magnet S7 and relay R5 attract their armatures. Contacts 140—141 break and prevent irrelevant selecting magnets and operating magnets to attract. When relay ER2 in Fig. 5 releases its armature, contact 25 closes and the lower winding of relay ER3, which has a low resistance, is connected over contacts 25 and 33 in the above mentioned test circuit, whereby operating magnet BM2 in Fig. 2 is made to attract its armature and connect line L2 to line F2 over contacts *a*23, *b*23, and *c*23. Relay GR5 attracts in the following circuit: +, contacts 533, 590 and 531, winding on relay GR8, wire *c*2, contacts C23, winding on operating magnet BM2, to negative. Contacts 551—554 are actuated. A ring signal is emitted on line L2 from wire CRG, which is connected to the ring aggregate RG in Fig. 3, the lower winding on relay GR7, contact 573, wire *b*2, contacts *b*23 and 1011, line L2 and the instrument A2, contact *a*23, wire *a*2, contact 571, to +. Relay GR7 is slow-operating and not sensitive to alternating current, but attracts when the called subscriber answers and the circuit over line L2 and instrument A2 is closed for direct current. During the ringing, the subscriber at instrument A1 hears a buzzer tone emitted from a buzzer generator S*u*3 over contacts 552, 561 and 581 and transformed between the windings on relay GR8. Upon answer relay GR7 actuates the contacts 571—579. Relay GR8 is connected to line F2 over contacts 572 and 574 and a communication is set up by condensers C3 and C4. Contacts 581 and 582 are actuated.

When contacts 553—554 are actuated, the holding circuit for relays PR6 and PR7 in Fig. 4 is broken as well as the current for relay ER6, which releases its armature. Contact 61 breaks the current for relays ER4 and MR7. The marker M is released. Contact 42 closes and relay ER2 attracts again. The subscriber at instrument A1 can now by means of an impulse on his dial switch line F1 from communication with line F2 to a renewed communication with the exchange line CL. At the beginning of the impulse relay PR6 releases, whereas relay PR7 is kept energized over contacts 453, 434 and 477. After the end of the impulse, relay PR7 also releases its armature, whereas contact 434 breaks. A communication is obtained with the exchange line CL over contacts 471 and 473. Relay GR9 attracts in the following circuit: +, winding on relay GR9, wire *d*, contact *d*41, the lower winding on relay PR4, which has a low resistance, contact 475, to negative. Contact 590 breaks and the connection over line F2 is held by contact 582 as long as the subscriber waits at instrument A2. The subscriber at instrument A1 can connect himself back to line F2 by means of a further impulse on his dial. If the subscriber at instrument A2 breaks the connection after instrument A1 has been switched to the exchange line CL, relay GR8 releases and the current for operating magnet FM1 is broken in contact 582.

Had line L2 been busy at the inquiry call, the test relay ER3 would have been actuated in the following circuit: +, contacts 43, 31 and 23, winding on relay GR6, to negative. Contacts 561—563 are actuated. Contact 565 breaks the current for relays ER4 and MR7, so that marker M is released. Contact 563 breaks the holding circuit for relays PR6—PR7 so that the subscriber at instrument A1 can connect himself to the exchange line CL by means of an impulse on his dial. Relay GR6 is kept energized over contact 564, push button OB, contact 533, to +. If an impulse is emitted from the dial on instrument A1 relays PR6 and PR7 release. Contact 475 closes. Relay GR9 actuates contact 590 and the connecting link GR is released. Relays GR2, GR3 and ER1 release their armatures. Selectors R*e*1 and R*e*2 are restored with current over contacts 12, 13, 14 and 15.

If an enquiry has been made and a communication has been connected between the lines L1 and L2 over line F2 the communication with the exchange line CL can be transferred from line L1 to line L2 if the subscriber at instrument A1 puts the micro-telephone down. Relays PR3, PR8 and PR5 in Fig. 4 thereby release. The current for the operating magnet BM1 in Fig. 2 is broken in contact 485 during the release time for the slow-operating relay PR2, whereby line L1 is short-circuited. Relay PR6 releases when contact 433 opens, and relay PR7 when contact 453 opens. Relays GR2 and GR3 release. Relays ER1, ER2 and ER5 are actuated and register GE is set according to the number of line L2. Relay GR8 is actuated and contact 582 closed. The operating magnet FM1 is kept energized over contacts 406, 582 and 51. Relays GR5 and GR8 and operating magnet BM2 in Fig. 2 release their armatures and line L2 is released. The following circuit is closed: +, contact 536, the lower winding on relay GR8, contacts 579 and 21, winding on relay ER6 to negative. Relay GR8 is kept and relay ER6 closes contact 61. Relays ER4 and MR7 are energized and actuate contacts 41—45 and 277—279, as described above. Relay MR1 in the marker M is re-energized over contact 44. The test circuit for relay ER3 is closed and since line L2 has been released as described above, relay ER3 will actuate contacts 31—33. The following circuit is closed: +, contacts 43, 32, 577, wire *e*, contacts *e*41, 461 and 442, wire *e*1, the upper windings on selecting magnet S9 and relay R5, to negative. Selecting magnet S9 and relay R5 attract their armatures. When relay ER2 releases, operating magnet BM2 attracts again. This time the contacts *a*24, *b*24 and *c*24 are closed simultaneously with the contacts 1021—1024 being actuated and line L2 being connected to line F1. The instrument A2 is fed through the windings on relay PR3 in Fig. 4 and is connected to the exchange line CL.

When the slow-operating relay ER5 in Fig. 5 releases its armature, the current is broken for the operating magnet FM1 by contact 51, and the connecting link GR with pertaining register GE is disconnected from the exchange line. Relays ER1 and GR7 release their armatures. Contact 579 breaks the current for relay ER6, which releases, whereby the current for relays ER4 and MR7 is broken by contact 61 and the marker M is released. The register GE is restored over circuits passing contacts 12, 13, 14 and 15, which have not been drawn on the drawing, since they are quite conventional. In the line equipment PR relay PR4 releases and relay PR8 attracts, when contact 441 is closed. The contacts 480—489 are actuated and relay PR2 attracts. Line L2 and the instrument A2 are thereafter connected to the exchange line instead of line L1 and instrument A1, and, if a further enquiry or transfer are desired in relation with the communication over the exchange line CL, the above described connecting process can take place again.

Incoming calls from the exchange line actuate the call relay PR9 in Fig. 4 by means of a ring signal. Contacts 491—492 are actuated. The following circuit is closed: +, contacts 443, 489 and 491, the lower winding on relay PR9, winding on selecting magnet S21, contacts 291, 296—195, and 293, to negative. The call-relay PR9 is kept in said circuit and selecting magnet S21 attracts its armature. Contacts 291—294 are actuated and one of the connecting links GR is connected as described above. Supposing that operating magnet FM1 closes contacts *a*41, *b*41, *c*41, *d*41 and *e*41, relay GR1 in Fig. 5 attracts. Relays PR4 in Fig. 4 and GR9 in Fig. 5 attract. Contacts 441—445 and contact 590 are actuated. The call lamp OL in the operating board OP glows in the following circuit: +, lamp OL, contacts 532 and 521, wire *d*, contact *d*41, the lower winding on relay PR4, which has a low resistance, contact 475 to negative. The operator in the operating board OP pushes the push-button OK and relay GR10 actuates contacts 591—599. Relay GR2 is energized over contact 593 in series with the impulse contact in the dial D and actuates the contacts 521—523. Relay GR3 actuates the contacts 531—538. Relay GR1 releases its armature and operating magnet FM1 is held in the following circuit: +, contacts 533, 594 and 406, winding on magnet FM1 to negative. The calling exchange line CL is put into communication with the operator in the operating board OP over contacts 481, and 483, *a*41 and *b*41, wires *a* and *b*, contacts 591 and 592 and operator's set OS. After the operator has been informed whereto the call has to be connected, she takes the corresponding number on the dial D. The impulse relay GR2 repeats the impulses to the register GE over wire *m*, and selectors R*e*1 and R*e*2 are set. The register GE sets a communication over line F2 with for example line L2 and instrument A2 as described above. Relay GR5 actuates contacts 551—554. When the subscriber at instrument A2 answers, relays GR7 and GR8 attract. Contacts 571—579 and 581—582 are actuated. The operator can now leave the connection and draws the push button OK up, whereby relay GR10 releases. Relays GR2, GR3 and GR5 release. The circuit over contacts 536 and 579 for relays GR8 and ER6 are closed The register GE busies the marker M and transfers the communication between the exchange line CL and the called line, for example L2, from line F2 to line F1. Thereafter the connecting link GR with pertaining register GE is released and the communication is connected in the same manner as an outgoing call. Enquiry and transfer can be effected as described above.

At the operating board OP there is a lamptable LT with 2 x 10 lamps, 4 of which are drawn on Fig. 5 and are connected by contacts 596—599. Said lamps show how the register GE is set, so that the operator has full control over her connections. At erroneous connections and at calls to a subscriber, who does not answer, or to a busy line, the operator can restore the register GE by pushing the button OB, whereby the current for relays ER1, GR5 and GR6 is broken. Thereafter a new telephone number can be chosen.

I claim:

1. An automatic branch exchange comprising a plurality of extension lines, a plurality of exchange lines, and means for interconnecting the said extension lines and the said exchange lines, said means comprising line equipment for each of said exchange lines, a first selector for each of the said extension lines, a first register and means connecting said register to a calling one of said extension lines, a marker connected to the said first register and arranged to switch an extension line to an exchange line, a link circuit, a selector arranged to connect said exchange lines to said link circuit upon incoming exchange line call to one of said extensions, a manual operating board having indicating means to advise the attendant thereof of the said connection to the said link circuit, a second register constituting a unit with said link circuit arranged to be set by the attendant and further arranged to connect to the said marker, a connecting circuit completed by said second register between the said link circuit and the said one of said extensions and including the said first selecting device whereby upon response by the said one of said extensions the said second register disconnects the said connecting circuit and connects the said one of said extensions to the line equipment for the said incoming exchange line.

2. An automatic branch exchange as set forth in claim 1, wherein the said line equipment includes a plurality of relays connected to be actuated by a signal of inquiry to another extension over said extension line connected to said exchange line, the said plurality of relays disconnecting the said exchange line and connecting the said extension line to the said link circuit through the said selector whereby the said second register is set by signals from the said extension corresponding to the telephone number of the said other extension to connect with the said connecting circuit and the said other extension.

3. The automatic branch exchange as set forth in claim 2, wherein upon manual disconnection of the instrument corresponding to the said extension the said second register connects the said other extension to the said exchange line through the said marker and the said extension and connecting circuit are disconnected.

4. An automatic branch exchange as set forth in claim 1, including groups of lamps at the said manual operating board, a key operated relay connecting said lamps to contacts in said second register whereby the said lamps constitute a visual indication of the setting of said register.

References Cited in the file of this patent

UNITED STATES PATENTS

| | | |
|---|---|---|
| 2,365,996 | Bakker | Dec. 26, 1944 |
| 2,496,902 | Voss | Feb. 7, 1950 |